United States Patent
Jiralerspong et al.

(10) Patent No.: US 12,311,971 B2
(45) Date of Patent: May 27, 2025

(54) VEHICLE CONTROL SYSTEM, AND VEHICLE CONTROL METHOD

(71) Applicant: Hitachi Astemo, Ltd., Hitachinaka (JP)

(72) Inventors: Trongmun Jiralerspong, Tokyo (JP); Ryoh Inaba, Tokyo (JP); Hidehiro Toyoda, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 220 days.

(21) Appl. No.: 17/787,703

(22) PCT Filed: Dec. 4, 2020

(86) PCT No.: PCT/JP2020/045176
§ 371 (c)(1),
(2) Date: Jun. 21, 2022

(87) PCT Pub. No.: WO2021/131597
PCT Pub. Date: Jul. 1, 2021

(65) Prior Publication Data
US 2023/0015466 A1 Jan. 19, 2023

(30) Foreign Application Priority Data
Dec. 24, 2019 (JP) .................. 2019-232384

(51) Int. Cl.
*B60W 60/00* (2020.01)
*B60W 30/095* (2012.01)
(Continued)

(52) U.S. Cl.
CPC .... *B60W 60/0011* (2020.02); *B60W 30/0956* (2013.01); *B60W 40/04* (2013.01);
(Continued)

(58) Field of Classification Search
None
See application file for complete search history.

(56) References Cited

U.S. PATENT DOCUMENTS 8,798,841 B1 * 8/2014 Nickolaou ......... B62D 15/0265
701/28
2017/0327094 A1 11/2017 Inoue et al.
(Continued)

FOREIGN PATENT DOCUMENTS

| JP | 2017-206039 A | 11/2017 |
| JP | 2019-137189 A | 8/2019 |
| WO | 2016/170647 A1 | 10/2016 |

OTHER PUBLICATIONS

International Search Report, PCT/JP2020/045176, Feb. 2, 2021, 2 pgs.

*Primary Examiner* — Peter D Nolan
*Assistant Examiner* — Michael F Whalen
(74) *Attorney, Agent, or Firm* — Volpe Koenig

(57) ABSTRACT

To provide a vehicle control system that is capable of planning a trajectory that can ensure more visibility and enables safe traveling when an invisible range of a sensor exists.

A vehicle control system that plans a target trajectory of a vehicle based on recognition information from an external environment sensor, the vehicle control system including a recognizing unit that recognizes an object at a periphery of the vehicle based on the recognition information; and a trajectory planning unit that plans the target trajectory such that an actual detection range of the external environment sensor becomes wide when the recognizing unit recognizes the object.

18 Claims, 19 Drawing Sheets

(51) Int. Cl.
*B60W 40/04* (2006.01)
*B60W 40/105* (2012.01)
*B60W 50/00* (2006.01)
*B60W 50/14* (2020.01)

(52) U.S. Cl.
CPC ...... *B60W 40/105* (2013.01); *B60W 50/0097* (2013.01); *B60W 50/14* (2013.01); *B60W 60/0015* (2020.02); *B60W 60/0053* (2020.02); *B60W 60/0059* (2020.02); *B60W 2050/143* (2013.01); *B60W 2050/146* (2013.01); *B60W 2554/4041* (2020.02); *B60W 2554/801* (2020.02); *B60W 2556/20* (2020.02); *B60W 2556/25* (2020.02)

(56) References Cited

U.S. PATENT DOCUMENTS

| | | | |
|---|---|---|---|
| 2018/0118144 A1* | 5/2018 | Yoshihira | B60W 30/095 |
| 2018/0194350 A1* | 7/2018 | Williams | B60W 10/18 |
| 2019/0244039 A1 | 8/2019 | Tsuchiya et al. | |
| 2020/0139974 A1* | 5/2020 | Schreiber | G08G 1/161 |
| 2020/0148223 A1* | 5/2020 | Fukatani | B60W 30/18 |
| 2020/0346690 A1* | 11/2020 | Maruoka | B62D 13/06 |

\* cited by examiner

DETECTABLE RANGE
OF SENSOR

DETECTABLE RANGE
OF SENSOR

VEHICLE CONTROL SYSTEM, AND VEHICLE CONTROL METHOD

TECHNICAL FIELD

The present invention relates to a vehicle control system and a vehicle control method for changing a traveling position of a vehicle according to a visibility rate of an external environment sensor at the time of automatic driving or driving assistance control of a vehicle.

BACKGROUND ART

As a technique for improving safety of an automatic driving system, for example, there is a driving assistance control device for a vehicle described in PTL 1. Claim 1 of PTL 1 discloses "A driving assistance control device of a vehicle including a blind spot area detection means that detects a blind spot area viewed from a vehicle in an advancing direction of the vehicle; a driving operation detection means that detects a driving operation of a driver; and an automatic deceleration control means that executes automatic deceleration control of the vehicle based on the detection of the blind spot area by the blind spot area detection means; wherein the automatic deceleration control means starts the automatic deceleration control with reference to the driving operation of the driver after the detection of the blind spot area by the blind spot area detection means".

According to the section [Effect of the Invention] in PTL 1, when a blind spot area is detected during traveling of a vehicle, automatic deceleration of the vehicle can be executed while predicting a potential risk that a pedestrian or the like may jump out from the blind spot area, wherein automatic deceleration control reflecting a driving intention of the driver can be executed by waiting for a braking operation or a steering operation of the driver or starting automatic deceleration control at any time point when a predetermined time has elapsed, instead of starting the automatic deceleration control regardless of the driving operation of the driver in the deceleration control.

CITATION LIST

Patent Literature

PTL 1: Japanese Patent Laid-open Publication No. 2017-206039

SUMMARY OF INVENTION

Technical Problem

In PTL 1, when a potential risk that a pedestrian may jump out from a blind spot area caused by a parked vehicle or the like is predicted, since automatic deceleration is executed without changing the steering control of the vehicle, there is a possibility that appropriate vehicle control with respect to an object cannot be executed as long as the type (person, bicycle, motorcycle, other vehicle, etc.) of the object in the blind spot area cannot be detected.

For example, in a case where the type of the object in the blind spot area is different from expected, it is conceivable that appropriate avoidance control cannot be performed for the behavior such as jumping out of the object. Furthermore, in a case where the actual moving speed of the object is faster than expected, there is a possibility that the collision avoidance control of the object is not in time. Moreover, even in a case where no object exists in the blind spot area, the own vehicle decelerates every time the blind spot area is detected, according to PTL 1, and hence traveling comfort may deteriorate.

An object of the present invention is to provide a vehicle control system that is capable of planning a trajectory that is easily sensed as much as possible and enables more safe traveling when a range that cannot be sensed by an external environment sensor exists.

Solution to Problem

In order to achieve the above object, a vehicle control system of the present invention plans a target trajectory of a vehicle based on recognition information from an external environment sensor, and includes a recognizing unit that recognizes an object at a periphery of the vehicle based on the recognition information; and a trajectory planning unit that plans the target trajectory such that an actual detection range of the external environment sensor becomes wide when the recognizing unit recognizes the object.

Advantageous Effects of Invention

According to the vehicle control system of the present invention, highly safe traveling support can be performed without decelerating by planning a traveling trajectory with a better visibility rate when the visibility rate of the external environment sensor is small.

DESCRIPTION OF EMBODIMENTS

Figure 1:
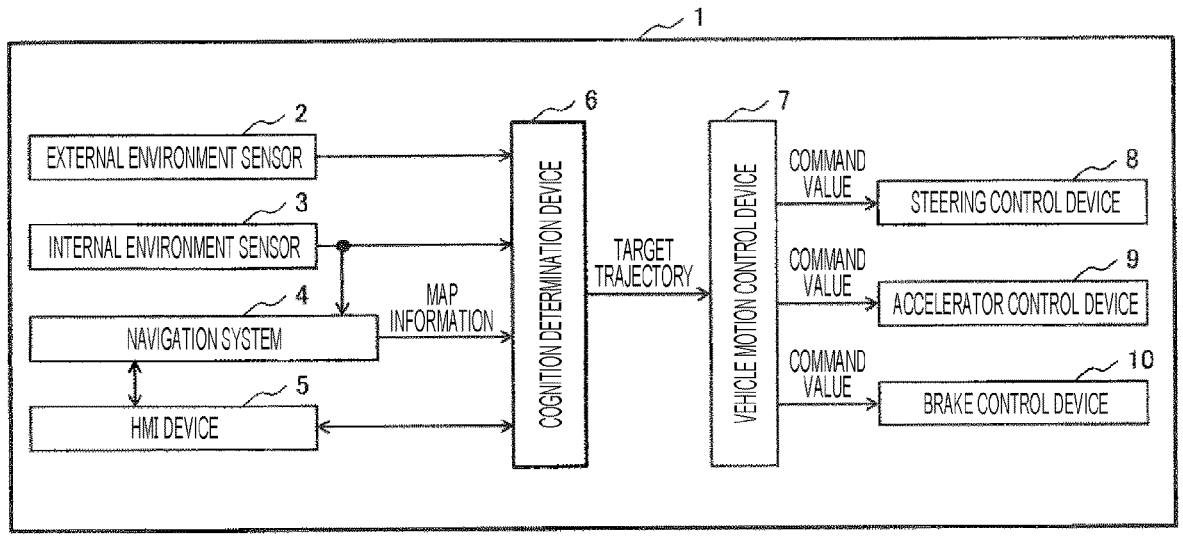
FIG. 1 is a system configuration diagram of an in-vehicle control system according to a first example.

Prior to describing examples of the present invention, an outline of the present invention will be described. Hereinafter, a moving body that recognizes the surrounding environment and automatically travels based on the recognition information is assumed. An example of the moving object is a vehicle (hereinafter, referred to as "own vehicle $V_0$"), but the application target of the present invention is not limited to the vehicle.

According to the present invention, in a vehicle control system that recognizes an object (other vehicles, motorcycles, people, and other objects) at a periphery of an own vehicle $V_0$ from recognition information of an external environment sensor mounted on the own vehicle $V_0$, plans a traveling trajectory of the own vehicle $V_0$ based on a recognition result of the object, and controls the vehicle to follow the traveling trajectory, a visibility rate indicating a ratio of an actual detection range with respect to a detectable range of the sensor is predicted based on the recognition result of the object, and when the predicted visibility rate is greater than or equal to a preset threshold value, the own vehicle $V_0$ automatically travels along the planned traveling trajectory. On the other hand, when the predicted visibility rate is less than or equal to the threshold value, the travel trajectory is re-planned so that the visibility rate becomes greater than or equal to the threshold value, and the own vehicle $V_0$ automatically travels along the re-planned traveling trajectory.

With the application of such a vehicle control system, in a case where an invisible range (blind spot area) of an external environment sensor exists due to an object, a traveling trajectory with better visibility is planned, and the vehicle is controlled to automatically travel on the traveling trajectory, so that both traveling safety and comfort can be achieved. That is, by making it possible to sense a blind spot area created by the presence of the object, an object (potential risk) hidden behind something can be detected and the vehicle can be appropriately controlled so as to avoid a collision with the object, and hence safety at the time of traveling can be further improved. In addition, if the object can be detected at an early stage, the avoidance control can be started earlier for dangerous acts such as jumping out of the object, and sudden acceleration/deceleration can be suppressed, so that traveling comfort of the vehicle can be improved.

Hereinafter, preferred examples of the present invention will be described with reference to the drawings. The pseudo numerical values and the like shown in the following examples are merely exemplifications for facilitating the understanding of the invention, and are not limited thereto unless otherwise specified.

First Example

First, a vehicle control system according to a first example of the present invention will be described with reference to FIGS. 1 to 5B. Note that the various constituent elements of the present example do not necessarily need to be independent from each other, and it is allowable that one constituent element includes a plurality of members, a plurality of constituent elements include one member, a certain constituent element is a part of another constituent element, a part of a certain constituent element overlaps with a part of another constituent element, and the like.

FIG. 1 is a system configuration diagram of an in-vehicle control system according to the first example. As shown here, an in-vehicle control system 1 includes an external environment sensor 2 that acquires information of the outside of the own vehicle $V_0$; an internal environment sensor 3 that detects an internal state of the own vehicle $V_0$; a navigation system 4 that detects a current position of the own vehicle $V_0$ and calculates a target route to a destination; a human machine interface (HMI) device 5 that serves as an interface when exchanging information between a driver or a passenger and the own vehicle $V_0$; a cognition determination device 6 that is a main part of the present invention, and calculates a target trajectory of the own vehicle $V_0$ at the time of traveling control based on information of the external environment sensor 2 and the internal environment sensor 3; a vehicle motion control device 7 that calculates various command values based on the target trajectory calculated by the cognition determination device 6; a steering control device 8 that controls a steering control mechanism of the own vehicle $V_0$ based on the command values; an accelerator control device 9 that controls a vehicle speed control mechanism based on a command value to adjust the speed of the own vehicle $V_0$; and a brake control device 10 that controls a brake control mechanism based on a command value to control the brake force of each wheel.

The external environment sensor 2 is an apparatus that acquires information (also referred to as recognition information) of the outside of the own vehicle $V_0$, and includes, for example, one or more of an optical wave sensor that detects an optical wave such as an infrared ray, an electromagnetic wave sensor that detects an electromagnetic wave such as a millimeter wave, and an image sensor such as a camera that images the outside. In the own vehicle $V_0$ of the present example, as the external environment sensor 2, a stereo camera and a millimeter wave radar are provided in the front, laser radars are provided on the left and right, and a millimeter wave radar is provided in the rear. Note that, in the present example, a combination of the above sensors is illustrated as an example of the sensor configuration, but this is not the sole case, and for example, a combination with an ultrasonic sensor, a monocular camera, a light detection and ranging (LiDAR), or the like may be adopted. In addition, the above-described sensor type and sensing region are merely shown as examples, and are not limited thereto.

The internal environment sensor 3 is an apparatus for acquiring an internal state of the own vehicle $V_0$. The internal state of the own vehicle $V_0$ includes speed, acceleration, posture, steering angle, steering torque, step-in amount, step-in speed, and the like of the pedal of the own vehicle $V_O$, and at least one of these is acquired. The internal environment sensor 3 is, for example, a vehicle speed sensor, an inertial measurement unit (IMU), a steering angle sensor, a steering torque sensor, or a pedal sensor. In the present example, a combination of the above sensors is exemplified as the sensor configuration, but this is not the sole case.

The vehicle speed sensor is an apparatus for measuring the speed in the advancing direction of the vehicle by detecting the rotation speed of the wheel of the vehicle as a pulse signal. The IMU is an apparatus for detecting acceleration and posture of the own vehicle $V_O$. As the IMU, for example, a configuration is considered in which a three-axis angular velocity sensor (gyro sensor) and a three-axis acceleration sensor are provided, and the acceleration and the posture of the own vehicle $V_O$ are detected by measuring a three-dimensional angular velocity and an acceleration signal. The steering angle sensor is an apparatus for detecting the steering angle of the own vehicle $V_O$, and may be built inside the steering control device 8. The steering torque sensor is, for example, a device that is provided to a steering shaft of a vehicle, and detects a steering torque applied to a steering wheel by a driver of the vehicle.

The navigation system 4 is a device that guides the own vehicle $V_O$ to a destination set by a driver or the like via the HMI device 5 to be described later. The navigation system 4 includes a global navigation satellite system (GNSS) and a map database, estimates a position (self-position) of the own vehicle $V_O$ on a map based on absolute position information (e.g., latitude and longitude of the own vehicle $V_O$) of the own vehicle $V_O$ from the GNSS, information of a landmark from a stereo camera of the external environment sensor 2, information of an acceleration sensor, an angular velocity sensor, and a vehicle speed sensor of the internal environment sensor 3, and information of the map database, and outputs map information around the own vehicle via the HMI device 5. In addition, the navigation system 4 calculates a target route to a set destination based on the estimated position information of the own vehicle $V_O$ and the map information of the map database. The position information and the map information of the own vehicle $V_O$ are transmitted to the cognition determination device 6.

The HMI device 5 is a device for inputting and outputting information between the driver and the like and the in-vehicle control system 1. The information input from the HMI device 5 is transmitted to the navigation system 4 and the cognition determination device 6. For information input from a driver or the like, a touch panel, an operation button, voice input, or the like can be used. The touch panel can be used, for example, for setting a destination or a path, enlarging or reducing a map, setting a driving mode (automatic driving or manual driving), and the like. The operation button can be used, for example, for volume adjustment, switching from automatic driving to manual driving, and the like. In addition, a display device or a speaker device is used to transmit information to a driver or the like. The display device is used for displaying a target route, displaying guidance to the destination (turning left at the next intersection, etc.), displaying a driving mode, monitoring a traveling state of the own vehicle $V_O$, and the like. The speaker device is used to transmit a guidance to a destination, an alarm and alert regarding traveling or surrounding environment of the own vehicle $V_O$, an instruction of a driving operation, and the like in conjunction with the display of the display device. Note that, in the present example, a combination of the above devices is illustrated as an example of the HMI device 5, but the present invention is not limited thereto, and for example, a voice recognition device may be provided as the HMI device for information input. In addition, as the HMI device 5 for information output, a lamp, a vibrator that applies vibration to the driver, a driver seat adjuster that changes an angle or a position of the driver seat, and the like may be provided.

Specifically, the cognition determination device 6 is a computer including a central processing unit (CPU), a memory such as a read only memory (ROM) and a random access memory (RAM), an input/output interface, and the like. The ROM stores programs for realizing a recognizing unit 61, a driving action planning unit 62, and a trajectory planning unit 63 to be described later, and when the CPU executes these programs read into the RAM, the surrounding environment of the own vehicle $V_O$ can be recognized based on the output of the external environment sensor 2, a target trajectory in which the own vehicle $V_O$ can safely avoid an object can be generated based on the recognition result, and the target trajectory can be transmitted to the vehicle motion control device 7. However, the function of the cognition determination device 6 described above is merely an example, and is not limited thereto. Note that the cognition determination device 6 may include a plurality of computers.

The vehicle motion control device 7 calculates a command value of the steering control mechanism, a command value of the engine control mechanism, and a command value of the brake control mechanism such that the own vehicle $V_O$ follows the target trajectory, and transmits each command value to the steering control device 8, the accelerator control device 9, and the brake control device 10. The steering control device 8, the accelerator control device 9, and the brake control device 10 control each control mechanism based on the received command value. Note that the vehicle motion control device 7 is also realized by a computer similarly to the cognition determination device 6, and both may be realized by one computer, or independent computers may be used.

The steering control device 8 is, for example, an electronic unit that controls electric power steering (EPS) of the vehicle. The steering control device 8 controls the steering angle of the vehicle by driving an assist motor that controls the steering torque of the vehicle in the electric power steering system. The steering control device 8 controls the steering angle in accordance with a control signal from the cognition determination device 6.

The accelerator control device 9 is an electronic control unit that controls acceleration of the vehicle. The accelerator control device 9 controls, for example, the speed of the vehicle by controlling a supply amount of fuel and a supply amount of air to the engine. When the vehicle is a hybrid vehicle or an electric vehicle, the accelerator control device 9 functions as a motor control unit that controls a motor driven as a power source. The accelerator control device 9 controls the speed of the vehicle in accordance with a control signal from the vehicle motion control device 7.

The brake control device 10 is an electronic control unit that controls a brake control mechanism of the vehicle. As the brake control mechanism, for example, a hydraulic brake control mechanism can be used. The brake control device 10 controls the braking force applied to the wheel of the vehicle by adjusting the hydraulic pressure applied to the hydraulic brake control mechanism. The brake control device 10 controls the braking force in accordance with a control signal from the cognition determination device 6. When the vehicle includes a regenerative brake control mechanism, the brake control device 10 may control both the hydraulic brake control mechanism and the regenerative brake control mechanism.

The in-vehicle control system 1 outlined above can appropriately control the speed of the vehicle by controlling the accelerator control device 9 and the brake control device 10 according to the surrounding environment of the own vehicle $V_O$ recognized on the basis of the output of the external environment sensor 2, and can realize the automatic lane maintaining control, the automatic lane changing control, the automatic merging control, the automatic branching control, the switching of the driving level, and the like by controlling the steering control device 8.

<Cognition Determination Device 6>

Figure 2:
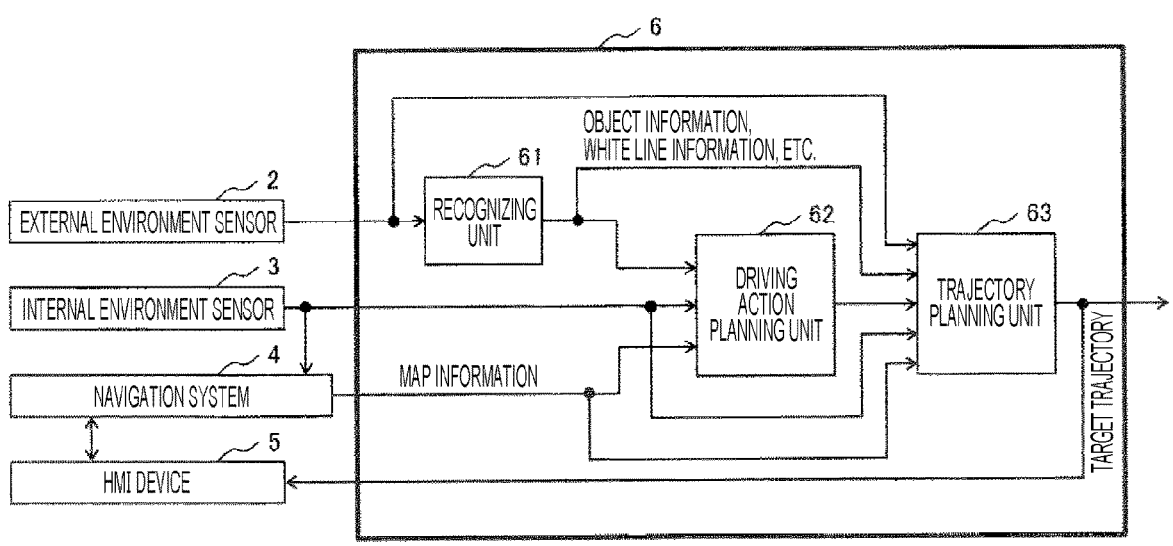
FIG. 2 is a functional block diagram of a recognition determination device according to the first example.

Next, a detailed configuration of the cognition determination device 6, which is a main part of the present invention, will be described with reference to a functional block diagram of FIG. 2. FIG. 2 is a functional block diagram of a cognition determination device 6 according to the present example. As illustrated here, the cognition determination device 6 includes a recognizing unit 61, a driving action planning unit 62, and a trajectory planning unit 63.

The recognizing unit 61 recognizes a sign, a white line, a road edge, an object, and weather based on the output of the external environment sensor 2, and outputs the recognition results to the driving action planning unit 62 and the trajectory planning unit 63. Here, the recognition result of the object includes information such as the position, speed, type, and size of the object. In order to recognize an object, first, an object around the own vehicle is detected based on information obtained from the external environment sensor 2. In order to detect an object, for example, a millimeter wave radar is irradiated, and a radio wave reflected back by the object is detected, whereby the distance and direction to the object are detected. In another method, an object is detected based on whether or not a shape of a gauge mark detected by a distance sensor matches a shape of a template stored in advance. Information of the size and shape of the object, and the position, absolute and relative speed from the own vehicle $V_O$ can be obtained by detecting the object through any of the methods. Note that the object detection method described above is merely an example, and this is not the sole case. Since there are other object detection methods, an arbitrary method may be appropriately selected in implementing the invention.

Next, after the object is detected, the type of the object is specified based on the information of the external environment sensor 2. To specify the object, which type on the database the object belongs to is specified, for example by providing images acquired from a stereo camera to an discriminator machine learnt in advance. Note that the discriminator includes a neural network, a support vector machine, and the like, and an arbitrary discriminator may be used. In addition, a plurality of discriminators may be used in combination. Furthermore, although details will be omitted, pre-processing such as filtering or feature extraction processing may be performed on the image acquired from the camera before inputting the image to the discriminator. Note that a method of recognizing a sign, a white line, and a road edge uses a general method such as pattern matching or edge extraction by Hough transform.

The driving action planning unit 62 plans a future driving action (function to be executed) of the own vehicle $V_O$ based on information of the internal environment sensor 3, map information from the navigation system 4, and information of a sign, a white line, a road edge, and an object of the recognizing unit 61, and outputs the future driving action to the trajectory planning unit 63. Here, the driving action is a function of automatic driving such as, for example, in-lane traveling control, automatic merging control, automatic lane changing control, automatic branching control, right turn at an intersection, left turn at an intersection, and straight ahead at an intersection. However, the present invention is not limited to the above function, and the driving action may be expressed with information such as a driving lane.

The trajectory planning unit 63 plans the target trajectory based on the input driving action, map information, information of white line, road edge, and object, information of the detectable range of the external environment sensor 2 stored in advance, and information of the actual detection range. Here, the detectable range of the external environment sensor 2 is a range based on the distance detectable by the external environment sensor 2 and the detectable angle. In addition, the actual detection range is a range that is not shielded by the object in the detectable range of the external environment sensor 2, and is a range that can be actually sensed by the external environment sensor 2. In the actual traveling environment, since many objects exist around the own vehicle $V_O$, the actual detection range may become smaller than the sensor detectable range, in which case, there is a possibility that an object (person, bicycle, motorcycle, other vehicle, etc.) will jump out from the range that cannot be sensed by the external environment sensor 2. In order to reduce the possibility of collision with an object in a blind spot area, the trajectory planning unit 63 plans a travel trajectory with a wider actual detection range.

<Calculation Method of Actual Detection Range>

Figure 3A:
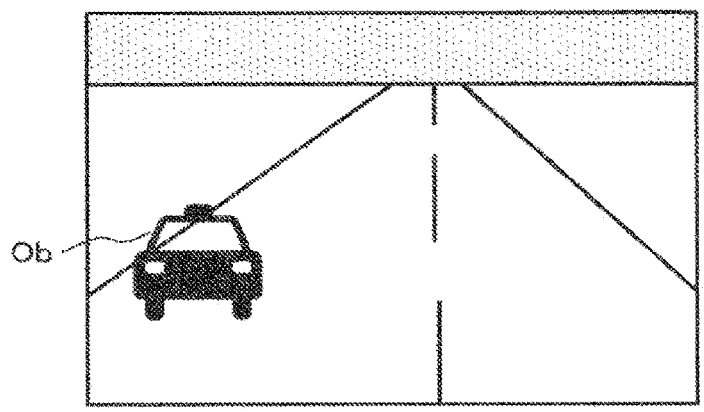
FIG. 3A is a diagram illustrating an example of an image imaged by an external environment sensor during traveling.
Figure 3B:
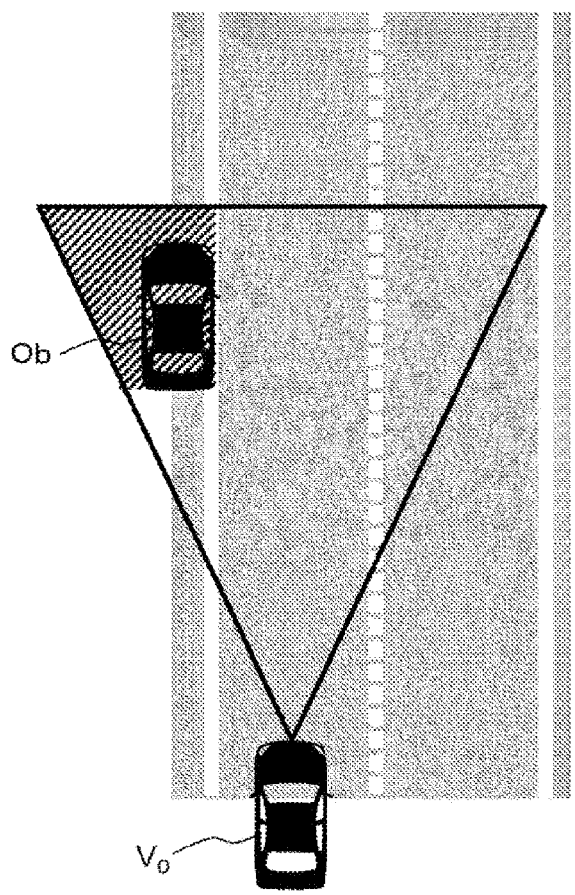
FIG. 3B is a diagram illustrating a detectable range and an actual detectable range of the external environment sensor.

Next, a method of calculating an actual detection range by the trajectory planning unit 63 will be described with reference to FIGS. 3A and 3B. First, the trajectory planning unit 63 converts an image of the front of the own vehicle acquired from the external environment sensor 2 (stereo camera) illustrated in FIG. 3A into an overhead view image (at this time point, object Ob does not exist) illustrated in FIG. 3B through a known image processing method. Next, the position of the object Ob on the overhead view image is specified based on the position information of the object Ob output from the recognizing unit 61. Subsequently, the length of the depth of the object Ob is predicted based on information on the type of the object Ob output from the recognizing unit 61, and a region of the object on the overhead view image is calculated based on the length of the depth and the width of the object output from the recognizing unit 61 (FIG. 3B). Next, the actual detection range of the sensor is calculated from the geometric relationship between the position and region of the object Ob and the detectable range of the external environment sensor 2 (FIG. 3B).

As illustrated in FIG. 3B, when the object Ob on the left side of the own lane is recognized as a stopped vehicle, a shaded portion that becomes a shadow of the stopped vehicle in the detectable range of the external environment sensor 2 indicated by a solid triangle corresponds to a blind spot area of the external environment sensor 2. In other words, in the sensor detection range indicated by the solid triangle, portions other than the shaded portion correspond to the actual detection range. Although details will be described later, the trajectory planning unit 63 plans the traveling trajectory of the own vehicle $V_O$ based on the visibility rate (=actual detection range/detectable range) which is the ratio between the actual detection range and the detectable range of the external environment sensor 2. Note that, in the above description, the sensor configuration used in calculating the actual detection range is merely an example, and is not limited thereto.

Next, a processing flow of the trajectory planning unit 63 that plans the traveling trajectory according to the actual detection range of the external environment sensor 2 will be described with reference to the flowchart of FIG. 4. Note that, in the situation exemplified below, it is assumed that automatic driving including automatic lane maintaining control, automatic lane changing control, and navigation control is being performed by the in-vehicle control system 1.

First, in step S1, the trajectory planning unit 63 acquires input information from the external environment sensors 2, a recognition result from the recognizing unit 61, and driving action information from the driving action planning unit 62.

Next, in step S2, the trajectory planning unit 63 determines a reference target point P1 after elapse of a predetermined time based on the acquired recognition result and the driving action information. Here, describing an example of how to determine the reference target point P1, for example, when the driving action information acquired from the driving action planning unit 62 is "straight ahead", the position of the own vehicle $V_0$ after, for example, 0.1 seconds in an empty space ahead of the lane in the overhead view image generated by the recognizing unit 61 is calculated and set as the reference target point P1 (see FIG. 5A). Note that the method of calculating the reference target point P1 is merely described as an example, and this is not the sole case.

Subsequently, in step S3, the trajectory planning unit 63 calculates the actual detection range and the visibility rate (=actual detection range/detectable range) of the external environment sensor 2 at the reference target point P1 based on the input information from the external environment sensor 2, the recognition result from the recognizing unit 61, and the driving action information from the driving action planning unit 62.

Next, in step S4, the trajectory planning unit 63 determines whether the visibility rate calculated in step S3 is greater than or equal to a preset threshold value (e.g., 70%).

Figure 5A:
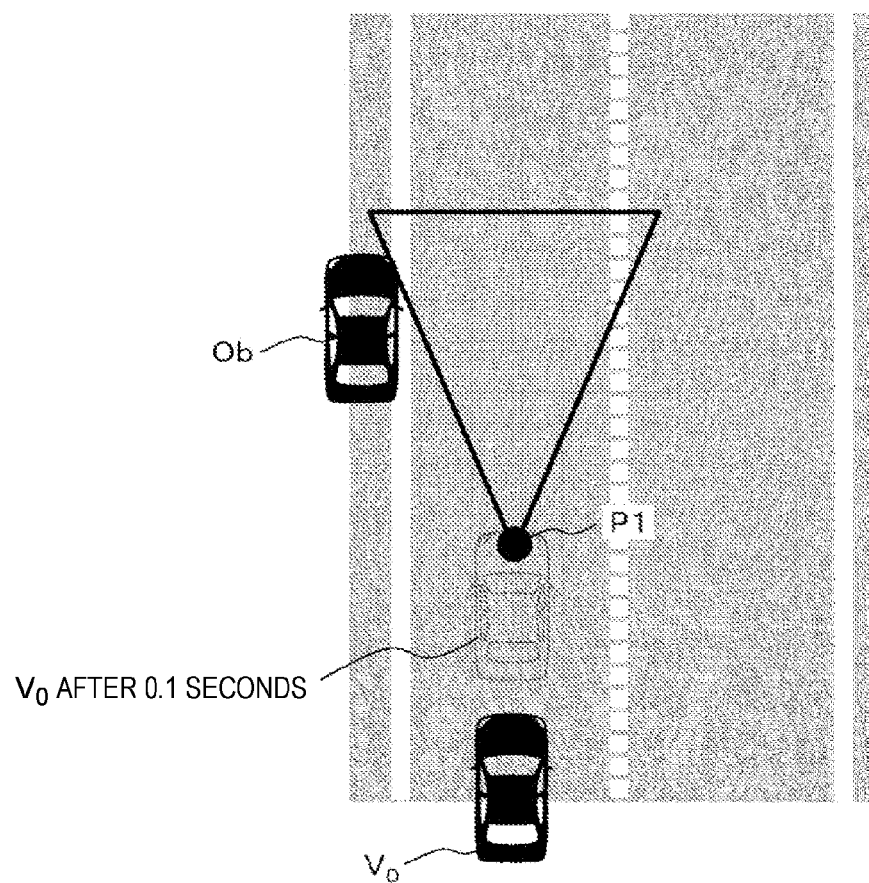
FIG. 5A is a diagram illustrating a result of trajectory planning in a case where a visibility rate is greater than or equal to a threshold value.

When the visibility rate is greater than or equal to the threshold value (Yes in step S4), the process proceeds to step S7, the reference target point P1 of the own vehicle $V_0$ is set as the target point, and the target trajectory is selected. Then, the process proceeds to step S8, and the target trajectory toward the reference target point P1 is output to the HMI device. Thereafter, the processing flow of the cognition determination device 6 is terminated, and the own vehicle $V_0$ travels toward the reference target point P1 as is without changing the steering control according to the control of the vehicle motion control device 7 (FIG. 5A). Note that the speed at the time of passing through the target point is also planned when planning the traveling trajectory.

On the other hand, when the visibility rate is less than the threshold value (No in step S4), the process proceeds to step S5, and an alternative target point P2 is set such that the visibility rate after a predetermined time becomes greater than or equal to the threshold value. For example, as illustrated in the left diagram of FIG. 5B, when the own vehicle $V_0$ is traveling on the left side of the own lane and the visibility rate at the reference target point P1 after a predetermined time is predicted to be less than the threshold value by the object Ob (stopped vehicle) on the left side of the own lane, the alternative target point P2 is set in a direction in which the own vehicle $V_0$ laterally moves away from the object Ob as illustrated in the right diagram of FIG. 5B. Specifically, a point laterally shifted from the reference target point P1 by a prescribed offset amount is set as the alternative target point P2. In the above description, the threshold value and the visibility rate are compared, but the actual detection range may be used as it is instead of the visibility rate. However, at that time, it is necessary to set a threshold value corresponding to the actual detection range in advance.

Figure 5B:
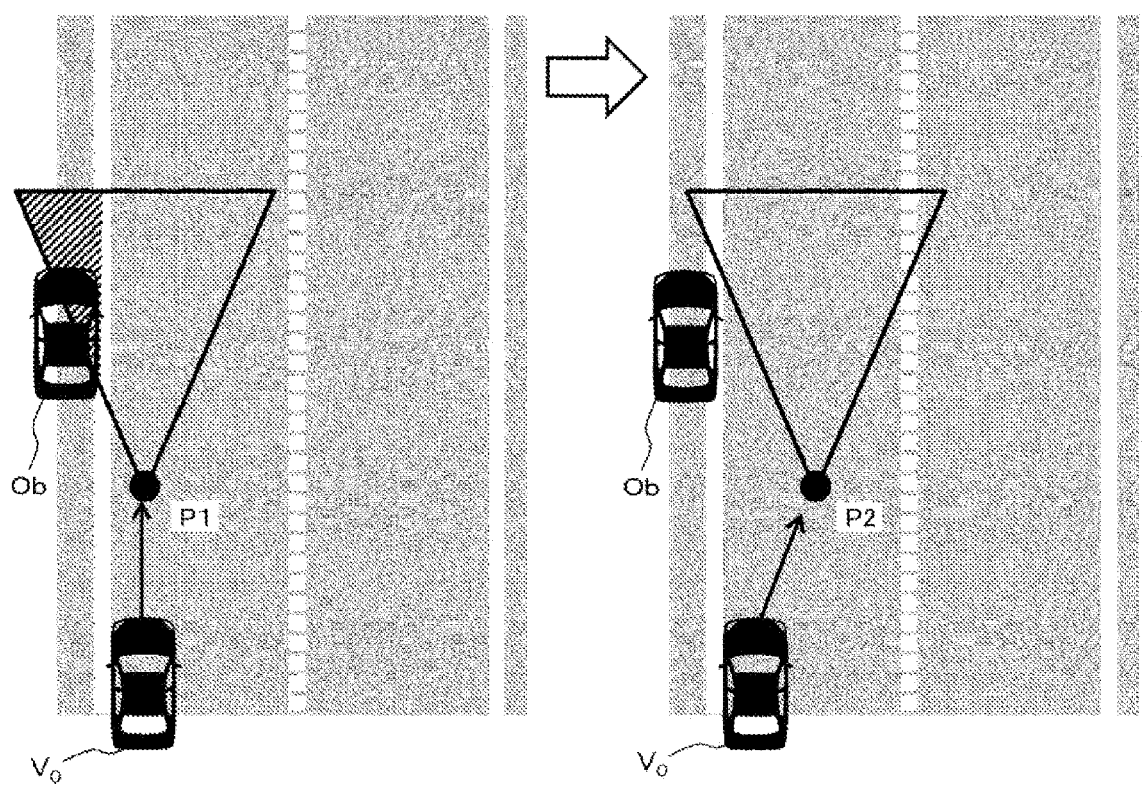
FIG. 5B is a diagram illustrating a result of trajectory planning in a case where the visibility rate is less than the threshold value.

As illustrated in the right diagram of FIG. 5B, it becomes easier to sense the blind spot area of the front of the object Ob by determining the target trajectory with a higher visibility rate. Thus, even if another object (person etc.) exists in the blind spot area of the object Ob, the other object can be detected earlier, and control for avoiding collision with the other object can be started early.

Subsequently, in step S6, whether or not the loop end condition has been achieved is determined, and whether or not to end the repetition of steps S3 to S5 is determined. When the loop end condition has not been achieved (No in step S6), the process returns to step S3 to recalculate the visibility rate at the alternative target point P2 set in step S5, and in step S4, and whether or not the visibility rate is greater than or equal to the threshold value is re-determined. Then, when the visibility rate is greater than or equal to the threshold value, the process proceeds to steps S7 and S8, and the own vehicle $V_0$ automatically travels toward the alternative target point P2. When the visibility rate is less than or equal to the threshold value also at the alternative target point P2, an alternative target point P3 further shifted in the lateral direction from the alternative target point P2 is set in step S5 again.

On the other hand, when the loop end condition has been achieved (Yes in step S6), that is, when the alternative target point where the visibility rate is greater than or equal to the threshold value cannot be planned under a predetermined condition, the process proceeds to step S7, and a trajectory toward the target point where the visibility rate is a maximum is selected as the target trajectory from among the alternative target points calculated so far. Thereafter, the process proceeds to step S8, the target trajectory is output to the HMI device, and a series of processes is terminated. Note that the selection of the target trajectory is not limited to the above method, and for example, the future target point calculated last may be selected.

Note that the repetition of steps S3 to S6 ends when any one of the following is achieved: a target point where a visibility rate is greater than or equal to a threshold value is found (Yes in step S4); or a loop end condition is satisfied (Yes in step S6), such as when a certain number of loops is reached. Here, as another example of the loop end condition, for example, the loop may be ended when the vehicle is already at the end of the own lane at the future target point calculated the previous time in response to a request to travel in the own lane from the driving action meter information.

As described above, by applying the vehicle control system described in the present example, in a case where the visibility rate of the sensor is not sufficient (in a case where the visibility is poor), both traveling safety and traveling comfort of the vehicle control system can be achieved by planning the next target point and the speed such that the visibility rate becomes greater than or equal to the threshold value. That is, since the risk of colliding with an object jumping out from the blind spot area around the object can be reduced by traveling on a trajectory that can ensure a sufficient visibility rate, the safety of the system can be improved. Furthermore, a sense of security can be further given to the driver or the passenger by causing the vehicle to travel on a trajectory with a better visibility. Moreover, if the visibility can be further secured according to the present invention, the object existing in the blind spot area can be detected early, and the collision avoidance control can be started more quickly, and hence traveling comfort of the vehicle can be improved without causing sudden acceleration/deceleration more than necessary. In addition, if it is found from the detection result that no object exists in the blind spot area, it is also possible to pass by the object without decelerating the own vehicle $V_0$, which leads to improvement in traveling comfort of the vehicle even in this case. In the above description, the front sensing has been described as an example, but the present invention can also be applied to the case of the rear sensing (details will be omitted).

Furthermore, in the above description, the configuration using the external environment sensor 2 and the recognition determination device 6 mounted on the own vehicle has been exemplified, but when the own vehicle includes a communication device compatible with high-speed communication, recognition information from an infrastructure sensor installed on a road may be used instead of recognition information from an in-vehicle sensor, or processing corresponding to the processing in the cognition determination device 6 may be executed by a server installed on a cloud.

Second Example

Next, a vehicle control system according to a second example of the present invention will be described with reference to FIGS. 6 to 9B. Note that duplicate description of contents similar to those of the first example will be omitted.

Figure 4:
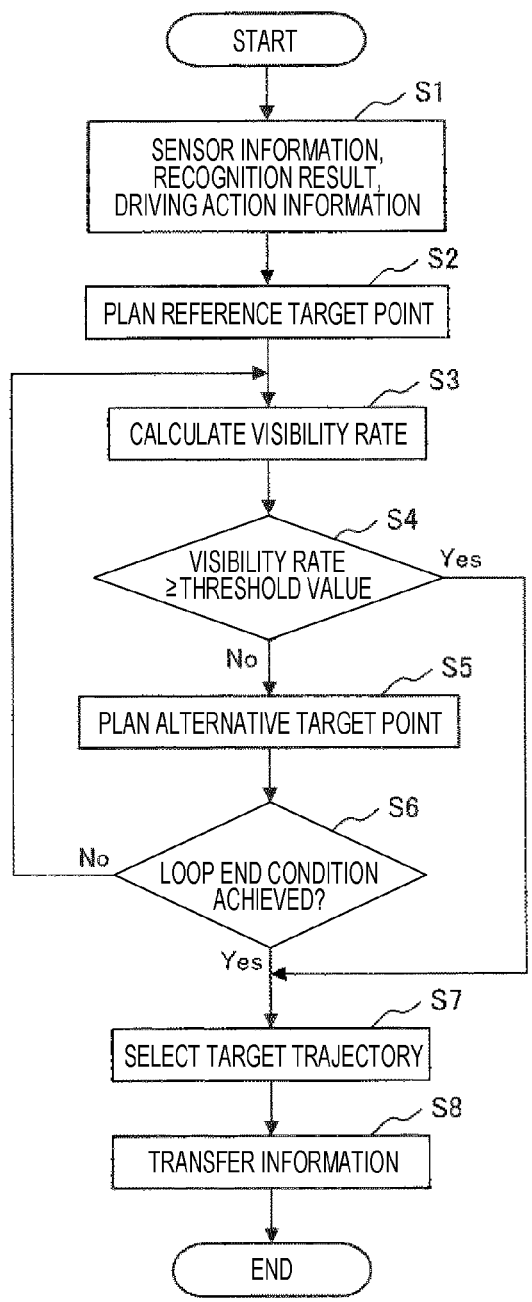
FIG. 4 is a flowchart of a process according to the first example.
Figure 6:
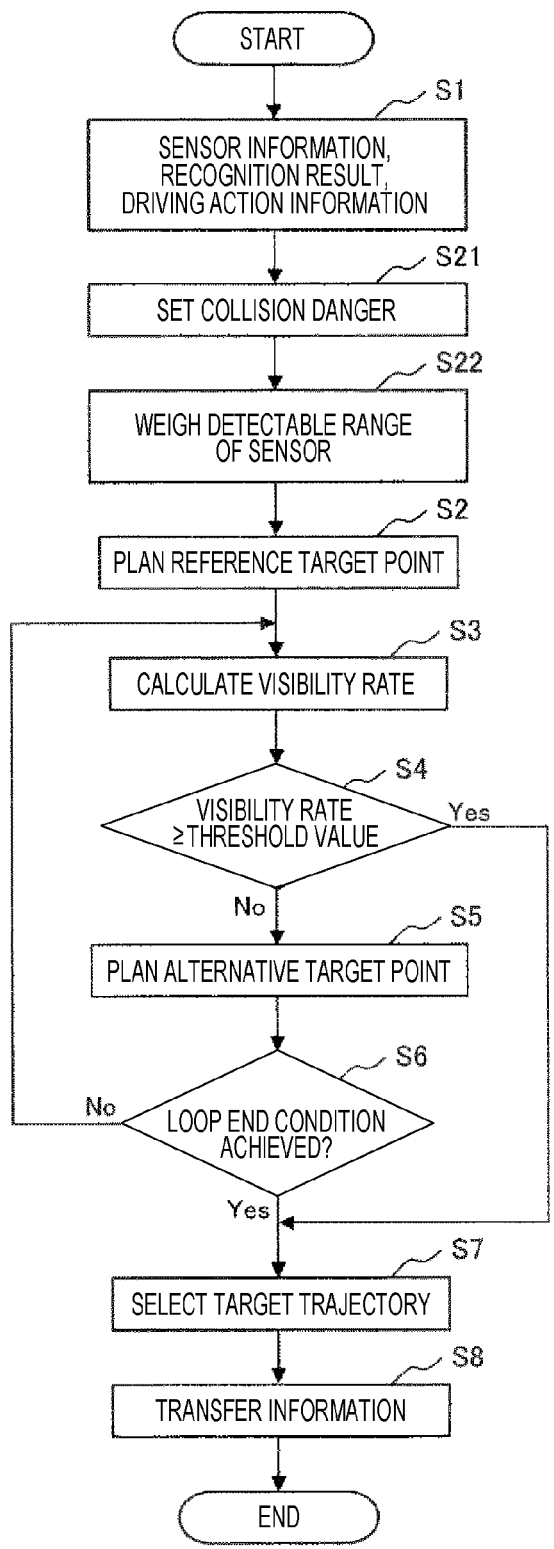
FIG. 6 is a flowchart of a process according to a second example.

The flowchart of FIG. 6 differs from the flowchart of FIG. 4 of the first example in that a process of setting a collision danger (step S22) and a weighting process of a detectable range of the external environment sensor 2 (step S21) are added between steps S1 and S2.

In the present example, a collision danger when predicting a risk that another object will jump out from the blind spot area of the object Ob and collide with the own vehicle $V_0$ is calculated (step S21) based on the recognition result output from the recognizing unit 61 and the driving action information output from the driving action planning unit 62.

Figure 7:
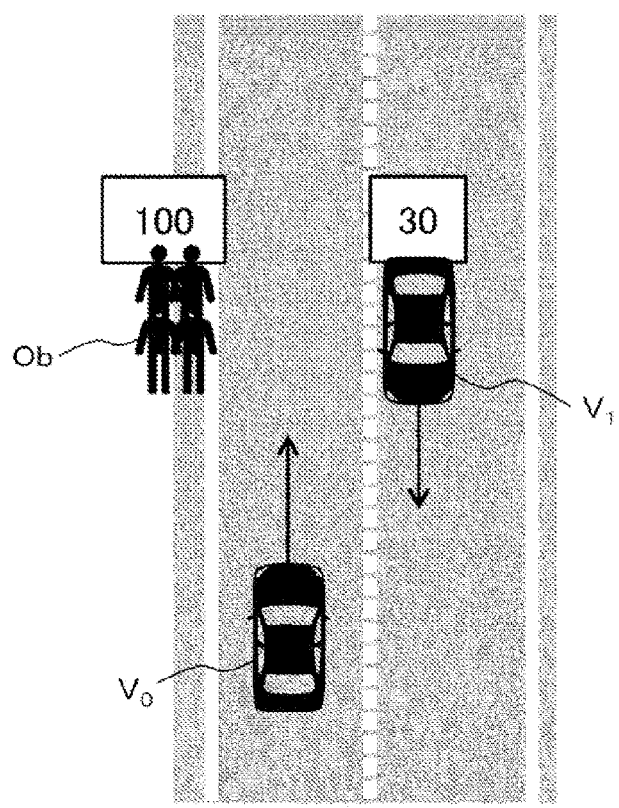
FIG. 7 is a diagram illustrating an example of collision danger prediction of a blind spot area.

For example, the maximum value and the minimum value of the collision danger may be set to 100 and 0, respectively, and higher numerical value may represent higher collision danger. As described above, in the prediction of the collision risk, the collision danger is set based on the relative position and the relative speed of the object around the blind spot area, the type of the object, and the like. The collision danger becomes lower as the distance of the blind spot area from the own vehicle $V_0$ becomes farther. As a specific example, the collision danger is set as illustrated in FIG. 7. In this example, the own vehicle $V_0$ travels on the center of a road with one lane on each side, an object Ob (group of people) exists on the front left side of the own lane, and another vehicle $V_1$ travels near the center line in the opposite lane. In this scene, since the person on the front left side stays at the same place and there is a high possibility that many people jump out from the blind spot area behind the group, the collision danger is set to 100, which is the highest. On the other hand, since the other vehicle $V_1$ in the opposite lane is moving, the blind spot area behind the other vehicle can be sensed after a micro time, and thus the possibility of jumping out from the blind spot area is set to 30, which is relatively low. Note that the method of calculating the collision danger is merely an example, and the method is not limited thereto.

Next, in step S22, weight is applied to the detectable range of the external environment sensor 2 based on the collision danger calculated in step S21. Although details will be described later, the detectable range of the external environment sensor 2 is divided into a plurality of regions, and weight is applied to each divided region based on the recognition result and the driving action information. Higher weight is applied the higher the importance of the sensing region. This weighted sensor detectable range is used when calculating the actual detection range in the processing of step S3.

Next, a method of applying weight on the detectable range of the external environment sensor 2 will be described with reference to FIG. 8A. In the left diagram of FIG. 8A, for example, a weight (e.g., 20%) higher than other regions is applied to a divided region closest to own vehicle $V_0$. This is because it is necessary to detect an object in front of the own vehicle $V_0$ in the advancing direction and quickly execute the collision avoidance control. Smaller weight is set the farther the divided region is from the own vehicle $V_0$. Furthermore, the weight of the blind spot area is set based on the collision danger calculated in step S21. In the previous example, since the collision danger (100) of the blind spot area behind the group of people is higher than the collision danger (30) of the blind spot area behind the other vehicle $V_1$, a higher weight (the former is 10% and the latter is 5%) is set to the divided region on the left far side than to the divided region on the right far side as illustrated in the left diagram of FIG. 8A. Note that a weight is applied so that the total value of the weights of all the divided regions becomes 100%. Note that the method of applying weight is merely an example, and the method is not limited thereto. In addition, the number of divided regions illustrated in the drawings is also merely an example, and is not limited thereto.

Figure 8A:
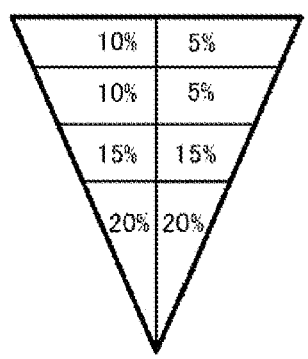
FIG. 8A is a diagram illustrating an example of a weight of a detection range of the external environment sensor.
Figure 8A:
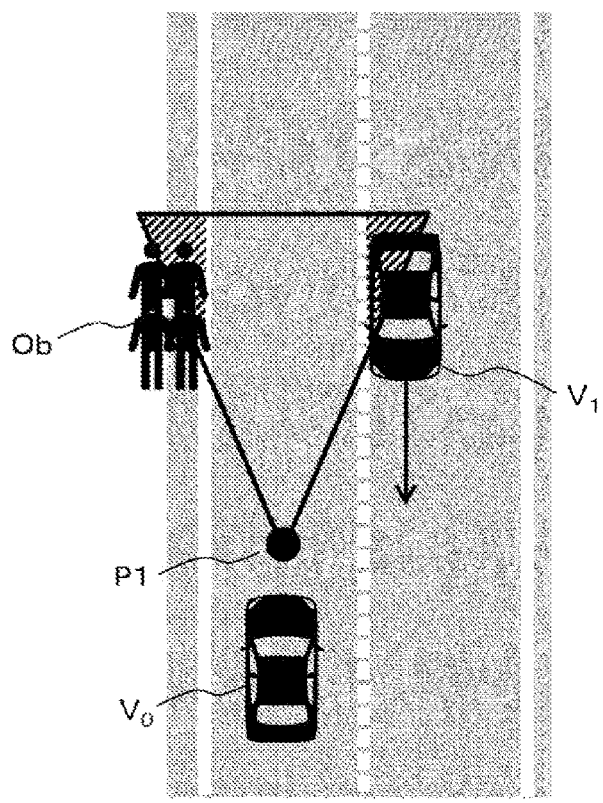
Figure 8B:
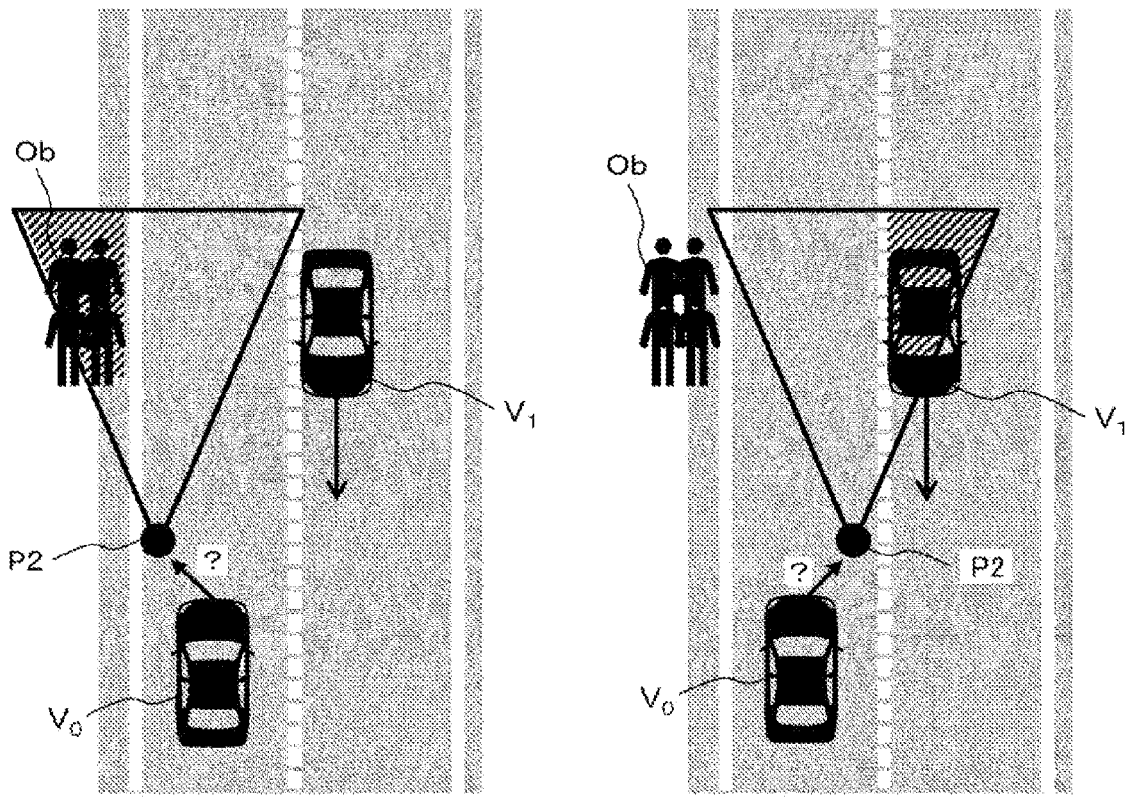
FIG. 8B is a diagram illustrating candidates for a target point for which trajectory planning can be performed in a case where a plurality of blind spot areas exist.

In the vehicle control system of the first example, as illustrated in the right diagram of FIG. 8A, when a plurality of invisible ranges exist, the traveling trajectory of the own vehicle $V_0$ can be changed to either the left or the right as illustrated in FIG. 8B, but as a larger blind spot area forms regardless of how the traveling trajectory is changed, the own vehicle $V_0$ travels near an area of high collision danger due to jumping out even if the traveling trajectory where a visibility rate is greater than or equal to the threshold value can be planned. As a result, if the object jumps out from the blind spot area, collision avoidance may not be in time, and thus there is a possibility that traveling safety is impaired.

Therefore, in the vehicle control system of the present example, as illustrated in the left diagram of FIG. 8A, the range to be sensed preferentially is set, and the vehicle is moved so that the blind spot area having a higher collision danger is easily sensed preferentially, whereby even if the object jumps out, the avoidance control can be started earlier, and the traveling safety can be further improved. In the vehicle control system of the present example, under the situation as illustrated in the right diagram of FIG. 8A, the target trajectory illustrated in the right diagram of FIG. 8B toward the alternative target point P2 on the right side, which makes it easier to detect the rear side of the group of people on the left side, is selected.

Figure 9A:
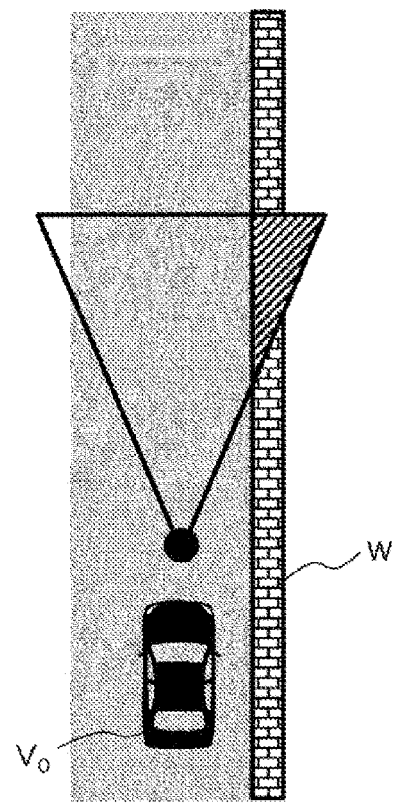
FIG. 9A is a diagram illustrating a case where a wall exists in a travel environment.
Figure 9B:
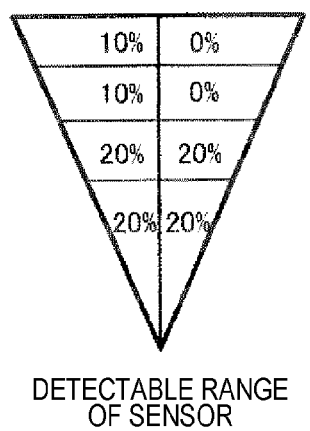
FIG. 9B is a diagram illustrating an example of a weight of a detection range of the external environment sensor in a case where a wall exists in the travel environment.

Note that, although details are omitted, a case where the right side of the lane is the wall W as illustrated in FIG. 9A is considered as another effective scene of the second example. Under such a situation, the weight of the detectable range of the external environment sensor 2 can be set to 0% at the right far side where there is no possibility of the object jumping out, for example, as illustrated in FIG. 9B. Here, the wall W around the own vehicle is detected by the recognizing unit 61, and the weight of the sensor detectable range is determined on the basis of the output result of the recognizing unit 61. In the first example, in a case where the wall W exists as shown in FIG. 9A, even when there is no sensing disabled region around the own vehicle, there is a possibility that the visibility rate will not be 100% because the detectable range of the sensor overlaps with the wall W. Here, for example, in a case where the threshold value of the visibility rate is set to 80%, when the detectable range of the sensor becomes less than or equal to the threshold value due to the presence of the wall W, there is a problem that the trajectory is planned to unnecessarily move the own vehicle $V_O$ sideways so that the visibility rate becomes greater than or equal to 80% although no sensing disabled region does not exist. Therefore, by applying the second example, a region where detection is unnecessary is specified in advance according to the surrounding environment, and the weight of the region is set to 0%, so that the visibility rate can be appropriately calculated, unnecessary trajectory planning can be prevented, and as a result, the lateral position of the own vehicle $V_O$ is not unnecessarily changed, and more comfortable traveling can be realized. Note that, although details are omitted, the weight of the sensor detectable range can also be determined based on, for example, weather (fog, rain, etc.) information in addition to the presence of the wall W.

Third Example

Next, a vehicle control system according to a third example of the present invention will be described with reference to FIGS. 10 and 11. Note that duplicate description of contents similar to those of the first example will be omitted.

Figure 10:
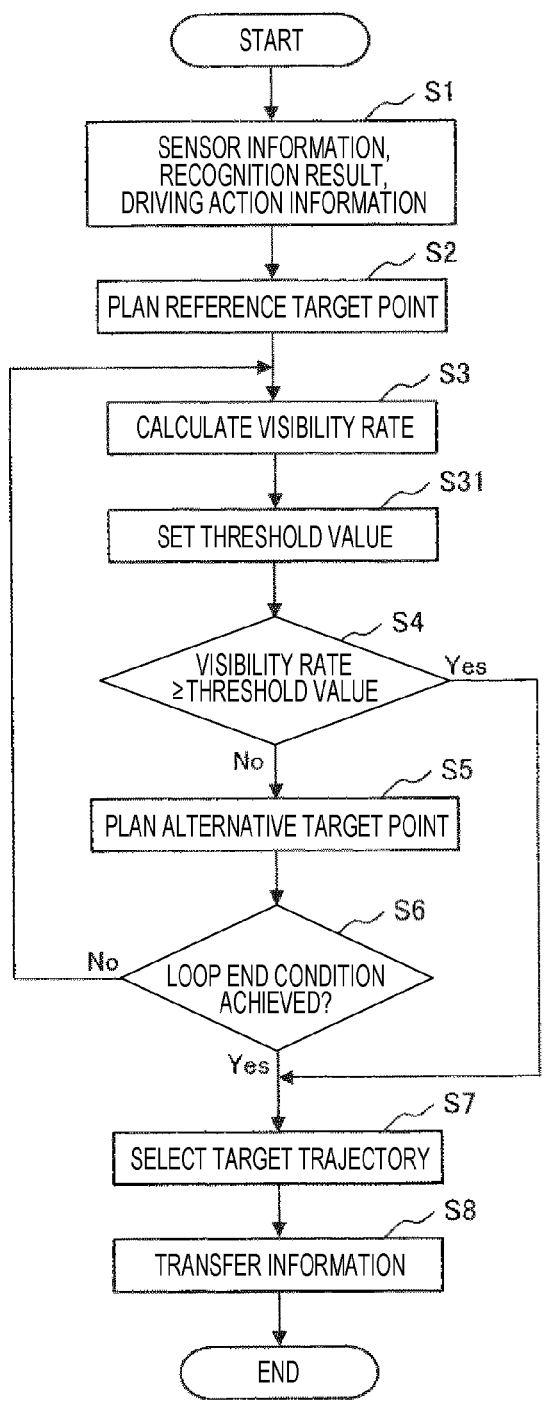
FIG. 10 is a flowchart of a process according to a third example.
Figure 11:
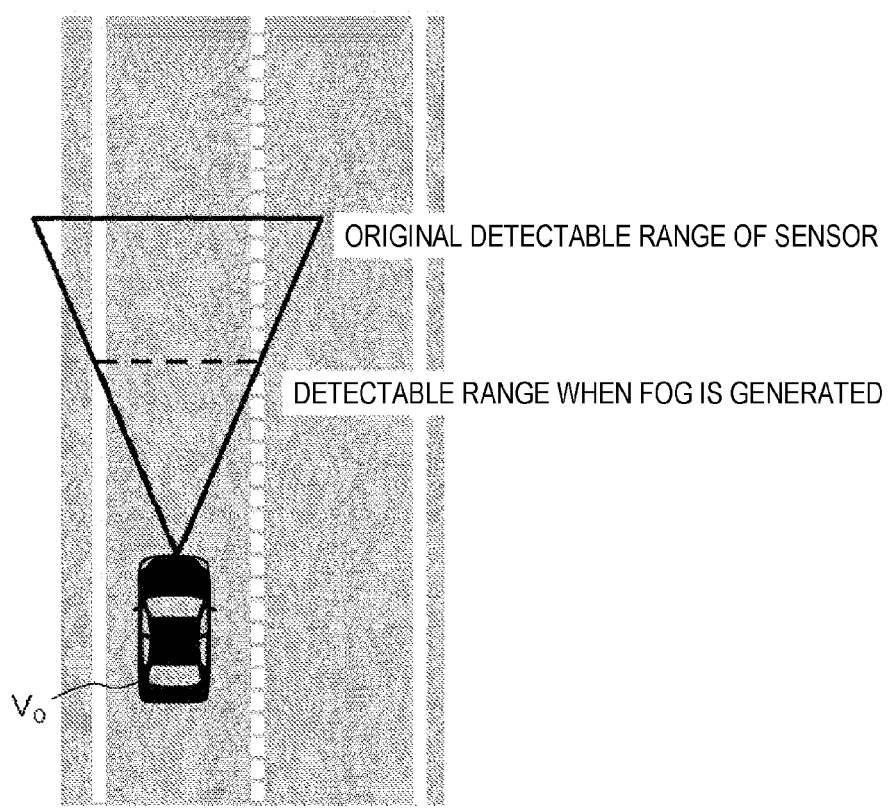
FIG. 11 is a diagram illustrating an example in which a detection range of an external environment sensor changes depending on weather.

The flowchart of FIG. 10 differs from the flowchart of FIG. 4 of the first example in that a process of setting a threshold value used in step S4 (step S31) is provided between steps S3 and S4.

In the third example, after the actual detection range is calculated, the value of the threshold value used in step S4 is set based on the output information of the recognizing unit 61. That is, in the present example, the threshold value is changed according to the surrounding environment of traveling. As an example of a method of setting the threshold value, the threshold value can be set based on, for example, weather information. For example, when fog is generated, the detection distance that can be visually recognized by the external environment sensor 2 (camera) is shorter than the normal detection distance. For example, as illustrated in FIG. 11, in a case where the detectable range becomes 50% as indicated by a broken line at the time of generation of fog with respect to the original detectable range indicated by a solid line, the value of the threshold value used in step S4 is set to 45%. In addition, different threshold values are set according to a type of weather, an external environment sensor to be used, or a combination thereof. Note that the method of setting the threshold value is merely an example, and the method is not limited thereto.

In the first example, when the detectable range of the external environment sensor 2 is narrowed by the weather, there is a possibility that even the best visibility rate under the weather condition may not be greater than or equal to a default threshold value (e.g., 80%). At this time, in a case where the invisible range of the sensor exists in the narrowed detectable range, a trajectory that can further secure the visibility is not generated, and hence traveling safety is impaired.

On the other hand, by applying the third example, even when the detectable range of the sensor is changed based on the weather, the lateral position of the own vehicle $V_O$ can be offset and a trajectory that is more easily sensed can be generated, so that traveling safety can be improved.

Fourth Example

Next, a vehicle control system according to a fourth example of the present invention will be described with reference to FIG. 12. Note that duplicate description of contents similar to those of the second example will be omitted.

Figure 12:
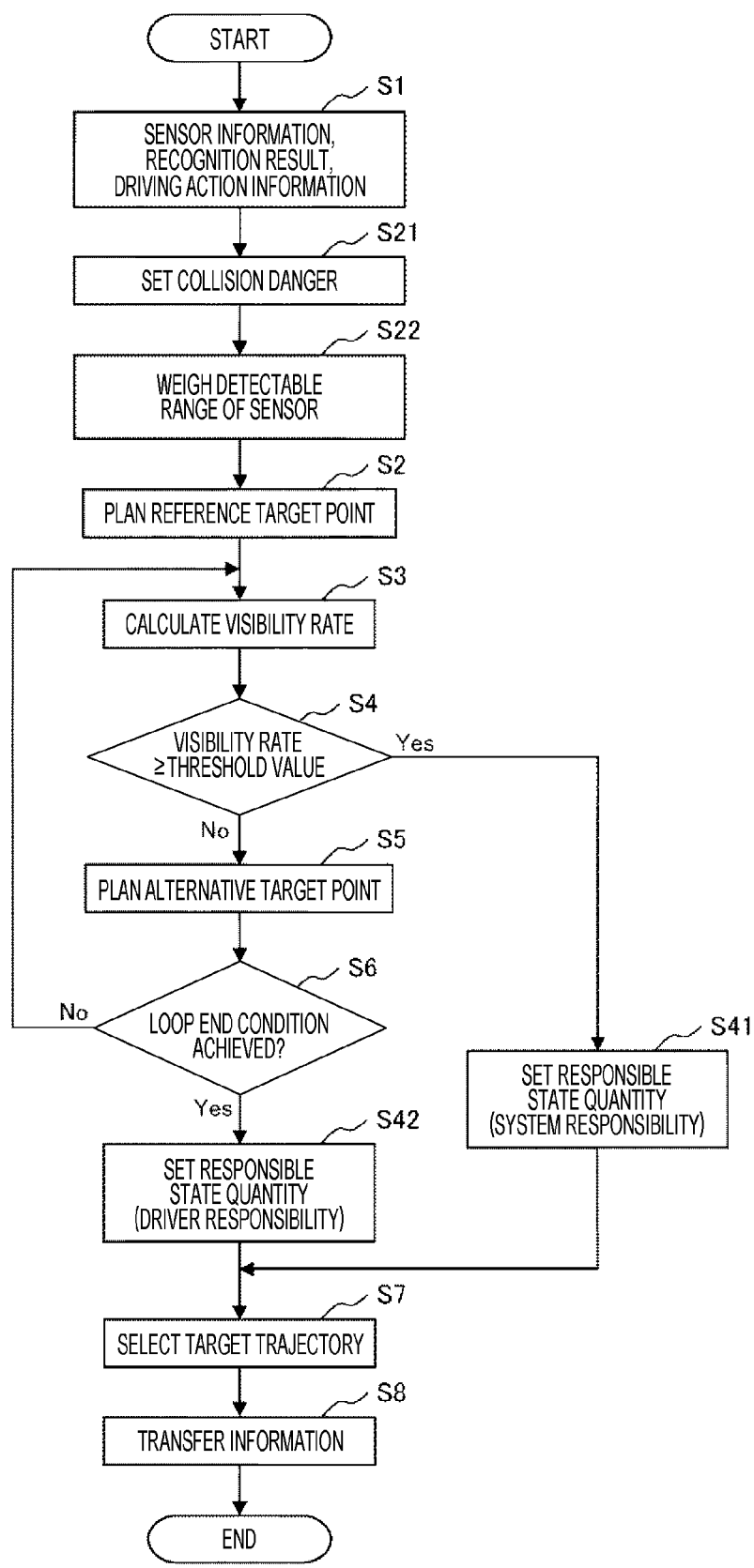
FIG. 12 is a flowchart of a process according to a fourth example.

The flowchart of FIG. 12 differs from the second example in that a process of setting a responsible state quantity (steps S41 and S42) is provided when Yes is determined in step S4 or step S6.

Figure 13A:
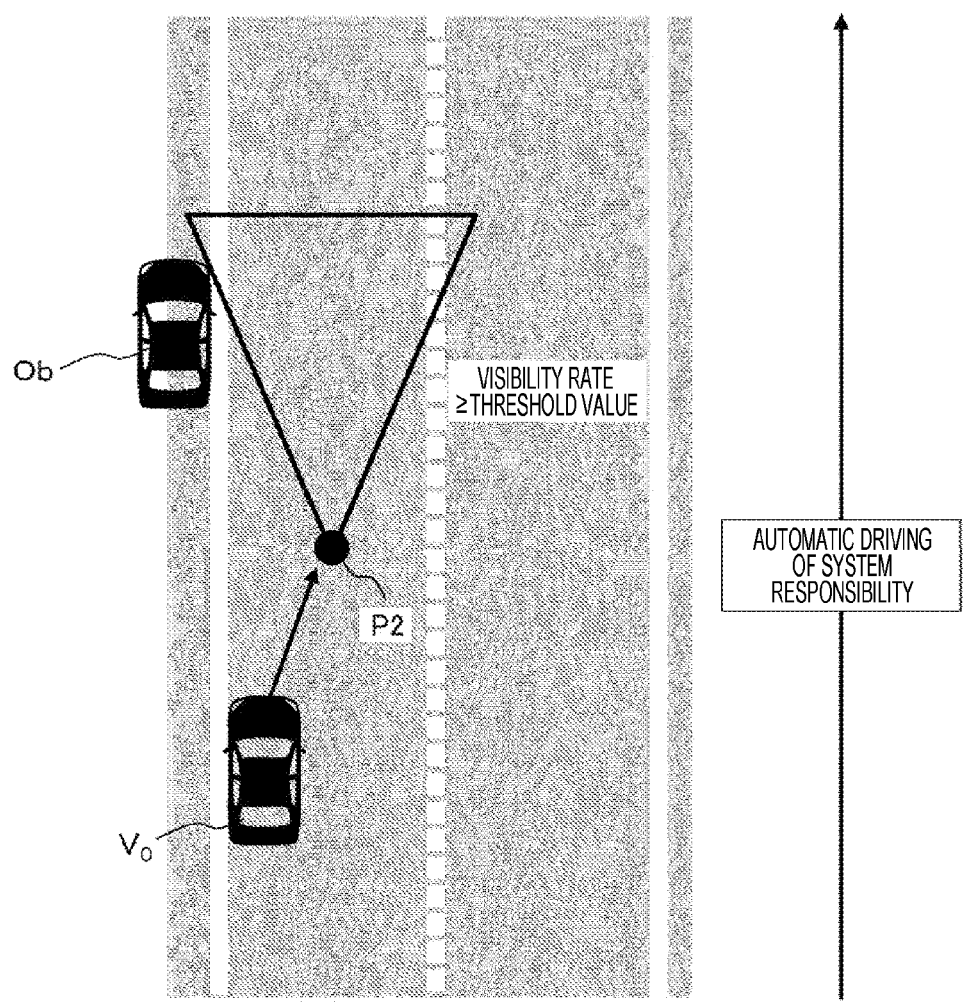
FIG. 13A is a diagram illustrating an operation in a case where a target point whose visibility rate is greater than or equal to a threshold value exists.

In the fourth example, when a target point where the visibility rate is greater than or equal to the threshold value exists (Yes in step S4), that is, when it can be predicted that driving by the vehicle control system can be safely continued as illustrated in FIG. 13A, the trajectory planning unit 63 outputs an automatic driving level of system responsibility to the HMI device 5, continues the automatic driving under system responsibility as it is, and sets the responsible state quantity corresponding to the automatic driving under the system responsibility (step S41).

Figure 13B:
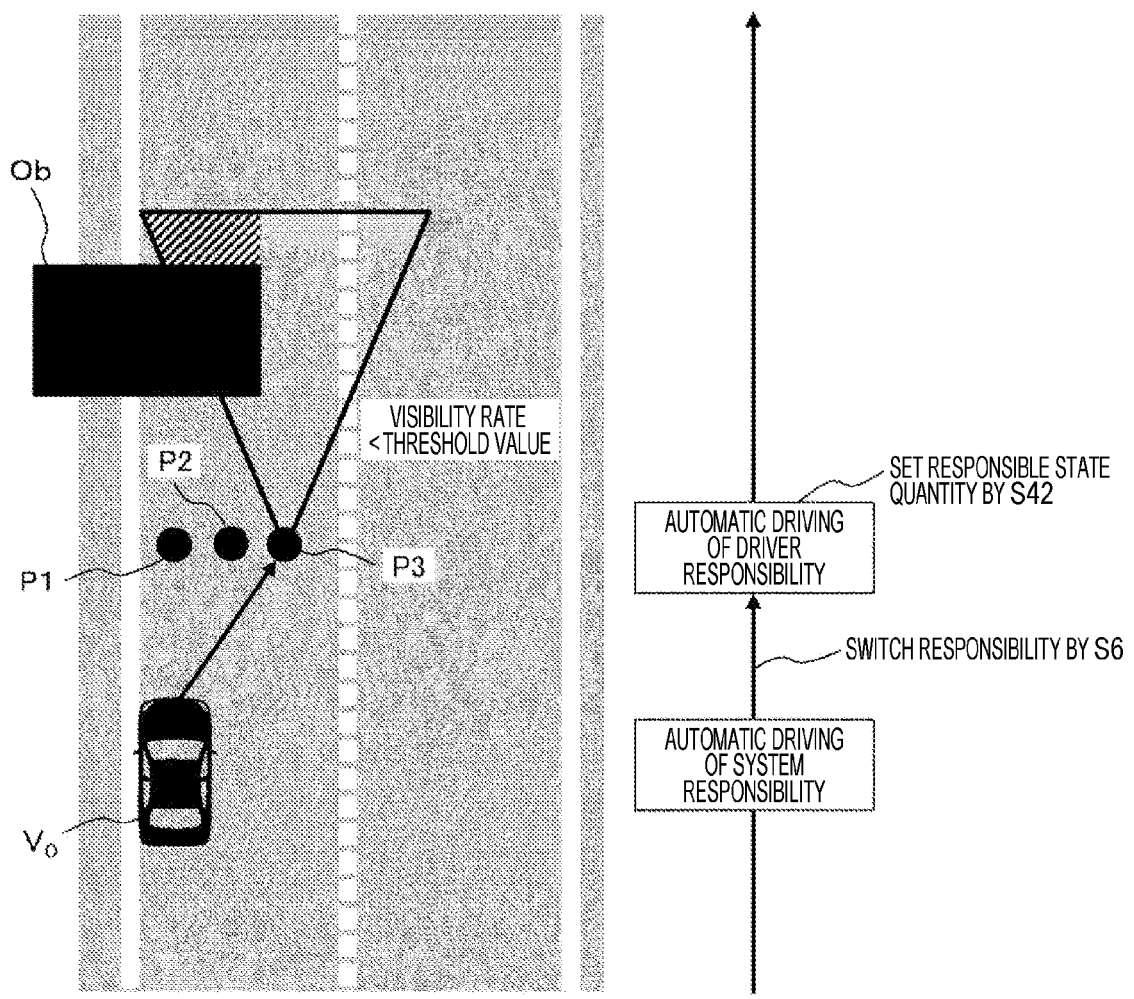
FIG. 13B is a diagram illustrating an operation in a case where a target point whose visibility rate is greater than or equal to the threshold value does not exist.

On the other hand, when a target point where the visibility rate is greater than or equal to the threshold value is not found even after the loop processing of steps S3 to S6 is finished (Yes in step S6), that is, when it can be predicted that safely continuing the driving by the vehicle control system is difficult as illustrated in FIG. 13B, the trajectory planning unit 63 sets a responsible state quantity corresponding to the automatic driving under driver responsibility and outputs the responsible state quantity to the HMI device 5.

In this case, the trajectory planning unit 63 alerts the driver via the HMI device 5 (display device, speaker device), performs an action such as requesting to grip the steering wheel, and switches to the automatic driving under the driver responsibility. Although not illustrated, in any of the above automatic driving levels, when the driver performs a driving operation (steering wheel operation, step-on on brake, accelerator, etc.), the automatic driving system terminates the automatic driving. Note that the above description has been described based on the flowchart in which the process of setting the responsible state quantity is added to the flowchart of the second example, but the present example can also be applied to the first example and the third example (details are omitted).

An operation example for a case in which the automatic driving system described above is applied is illustrated in FIGS. 13A and 13B.

FIG. 13A is a diagram illustrating an operation of the vehicle control system when an alternative target point where the visibility rate is greater than or equal to the threshold value exists, and FIG. 13B is a diagram illustrating an operation of the vehicle control system when an alternative target point where the visibility rate is greater than or equal to the threshold value does not exist.

As illustrated in FIG. 13A, when an alternative target point P2 where the visibility rate is greater than or equal to the threshold value exists (Yes in step S4), the automatic driving under the system responsibility is continued so that the own vehicle $V_O$ automatically travels toward the alternative target point P2.

On the other hand, as illustrated in FIG. 13B, when an alternative target point where the visibility rate is greater than or equal to the threshold value does not exist at any position on the own lane as in a case where a large object Ob (e.g., a large bus, a truck, or the like stopped at a road edge, a fallen tree, a fallen rock, etc.) protrudes out on the own lane (Yes in step S6), the cognition determination device 6 of the own vehicle $V_O$ changes the automatic driving level so as to switch from the automatic driving under the system responsibility to the automatic driving under the driver responsibility in step S42, and also alerts the driver through the HMI device 5 and performs an action such as requesting to grip the steering wheel.

As described above, by applying the vehicle control system described in the present example, when no alternative target point where the visibility rate is greater than or equal to the threshold value exists, the automatic driving level can be appropriately changed from system responsibility to driver responsibility, and traveling safety can be improved. That is, when the target trajectory that can secure a sufficient visibility for safe traveling cannot be calculated, it is possible to notify the driver of the possibility that the risk prediction hidden in the sensing disabled region cannot be performed in advance by switching to the automatic driving under the driver responsibility, and the safety of the system can be improved.

Fifth Example

Next, a vehicle control system according to a fifth example of the present invention will be described with reference to FIGS. 14 to 16. Note that duplicate description of contents similar to those of the second example will be omitted.

Figure 14:
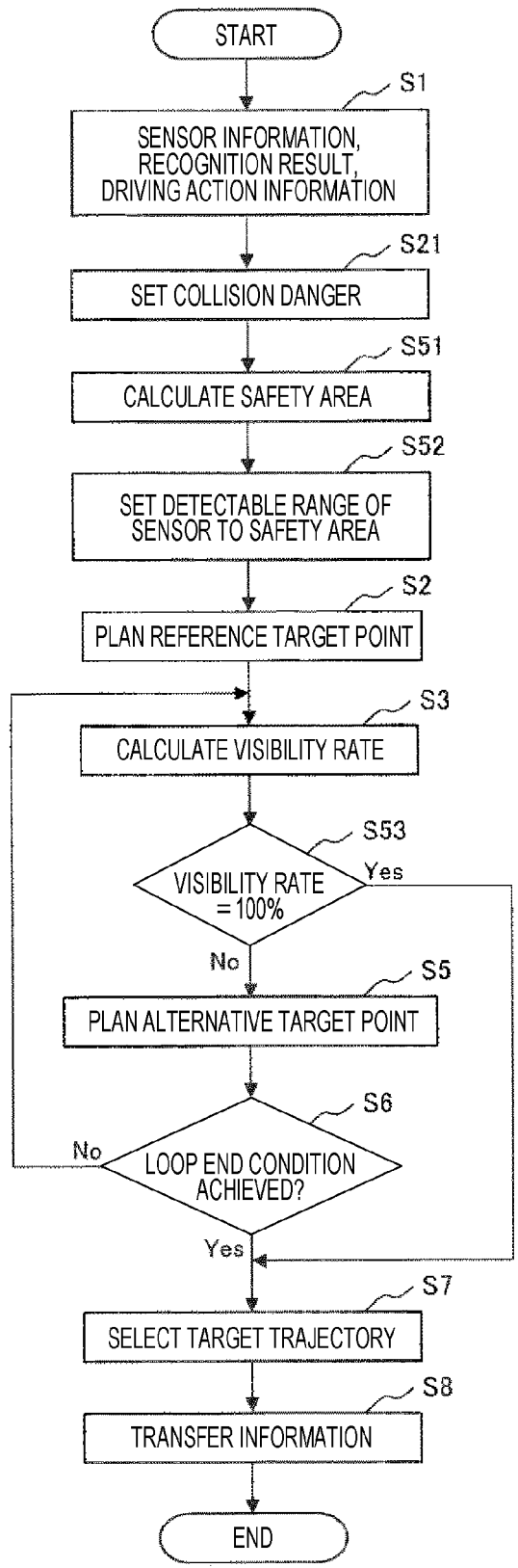
FIG. 14 is a flowchart of a process according to a fifth example.

The flowchart of FIG. 14 is different from the flowchart of FIG. 6 of the second example in that a process of calculating a safety area (step S51) and a process of setting a detectable range of a sensor in the safety area (step S52) are added between step S21 and step S2, and a process of determining whether a visibility rate is 100% (step S53) is added between step S3 and step S5.

In the present example, a collision danger when predicting a risk that another object will jump out from the blind spot area of the object Ob and collide with the own vehicle $V_O$ is calculated (step S21) based on the recognition result output from the recognizing unit 61 and the driving action information output from the driving action planning unit 62.

Next, in step S51, a safety area for avoiding collision with the object jumping out is calculated based on the collision danger calculated in step S21, the speed of the own vehicle $V_O$, and the maximum speed of the object jumping out. Here, the safety area is an inter-vehicle distance required when, even if another object jumps out from the blind spot area of the object Ob, the own vehicle $V_O$ can stop in front of a point where the own vehicle $V_O$ collides with the object that jumped out, can avoid collision by steering without colliding with the object, or both.

Figure 15A:
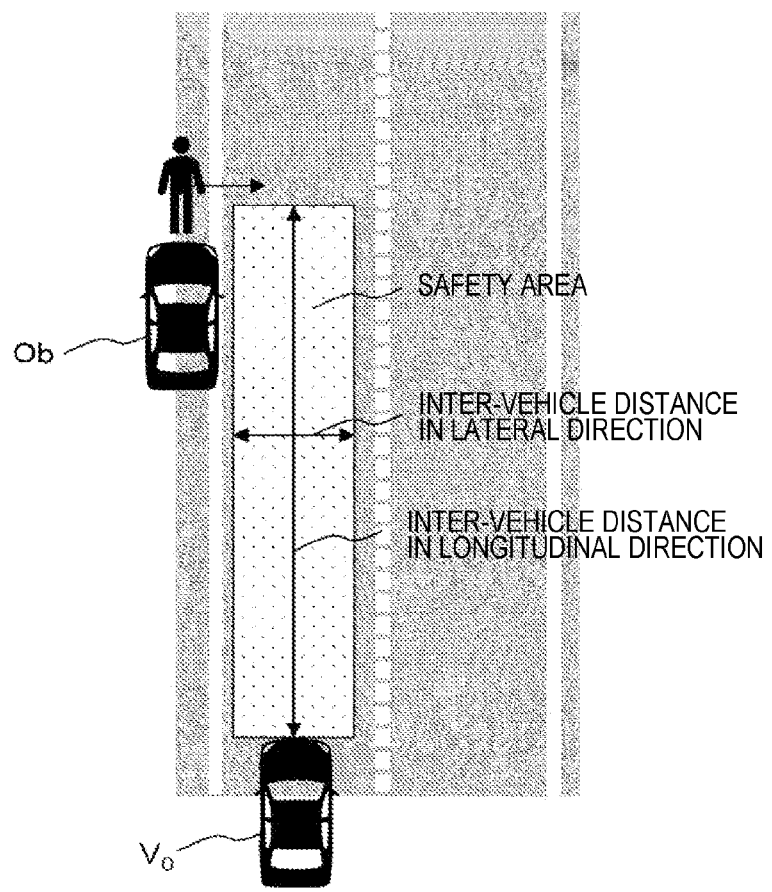
FIG. 15A is a conceptual diagram of a safety area.
Figure 15B:
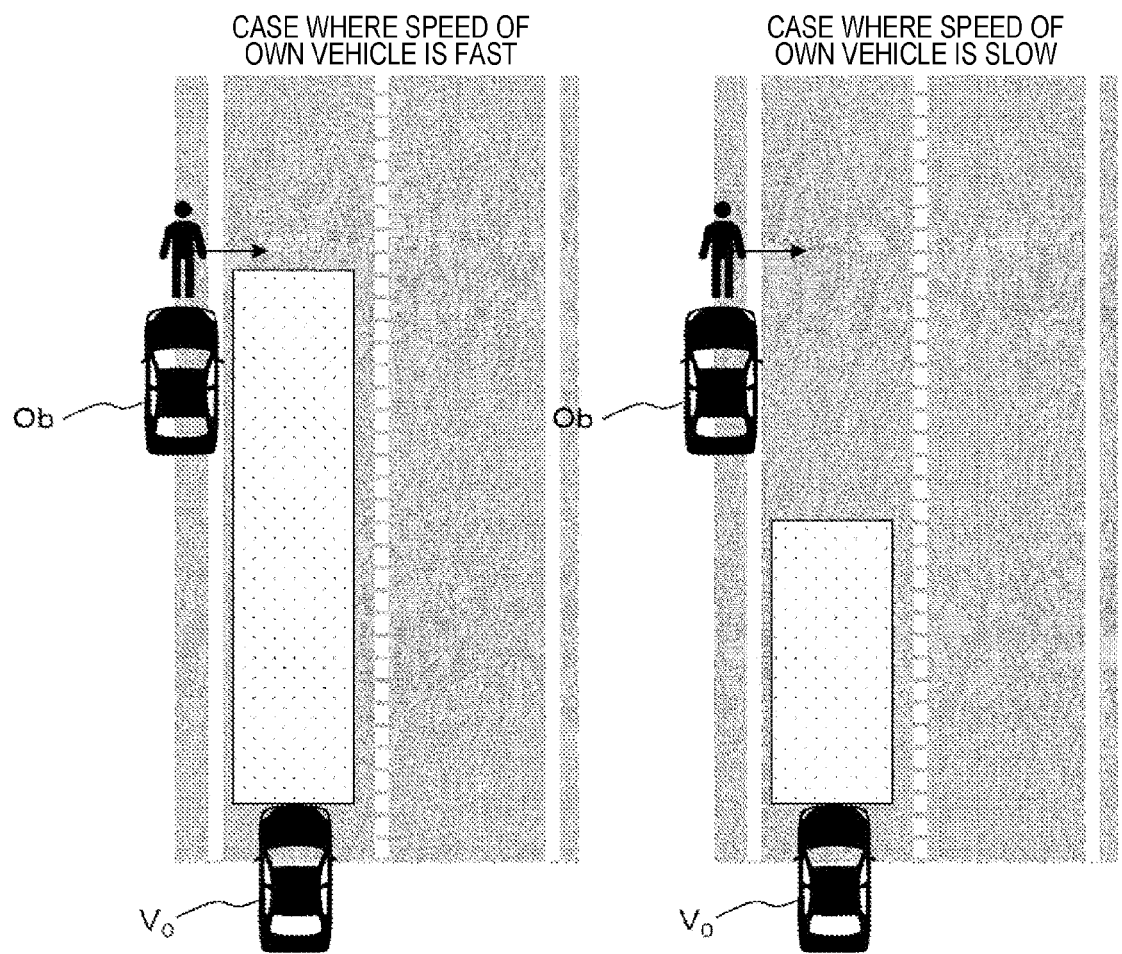
FIG. 15B is a conceptual diagram of a safety area that changes according to the speed of the own vehicle.
Figure 16:
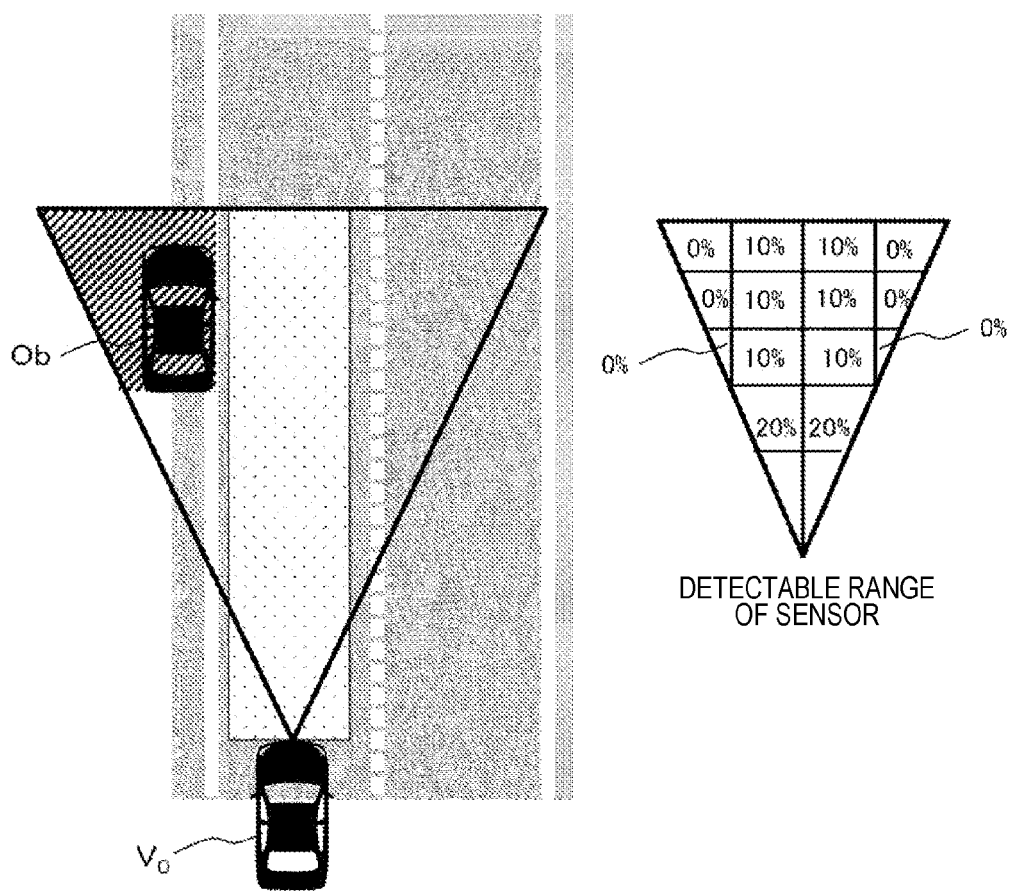
FIG. 16 is a diagram illustrating an example of a relationship between the safety area and a weight of the detection range of the external environment sensor.

As illustrated in FIG. 15A, the safety area is an area defined by an inter-vehicle distance in a longitudinal direction extending from the own vehicle $V_O$ in the advancing direction and an inter-vehicle distance in a lateral direction extending perpendicularly to the advancing direction of the vehicle. In addition, the safety area changes depending on the speed of the own vehicle $V_O$ and the maximum speed of the object jumping out. For example, as illustrated in the left diagram of FIG. 15B, when the speed of the own vehicle $V_O$ is high, the safety area is long and thick. On the other hand, as illustrated in the right diagram of FIG. 15B, when the speed of the own vehicle $V_O$ is low, the safety area is short and thin. Note that, in the present example, the description will be made using the safety area that takes into consideration the inter-vehicle distances in the longitudinal direction and the lateral direction, but only the inter-vehicle distance in one direction may be considered. With the calculated safety area, it can be seen how long the inter-vehicle distance should be maintained in order not to collide with the own vehicle $V_O$ even if the object jumps out from the blind spot area. That is, if the own vehicle $V_O$ can keep the object from entering the safety area, the collision can be avoided even if there is an object jumping out. However, when the object jumping out enters the safety area, the own vehicle $V_O$ needs to decelerate by the brake, avoid collision by steering, or both.

Subsequently, in step S52, the detectable range of the sensor is set as the safety area based on the safety area calculated in step S51. The sensor detectable range based on the safety area is used when calculating the visibility rate in step S3. Furthermore, in addition to the method of setting the original sensor detectable range as the safety area, for example, as illustrated in FIG. 16, the sensor detectable range can be weighted based on the safety area. Note that the weight of the sensor detectable range illustrated in FIG. 16 is merely an example, and is not limited thereto.

In step S53, whether the visibility rate is 100% is determined based on the visibility rate calculated in step S3. When the visibility rate is 100% (Yes in step S53), the process proceeds to step S7, the reference target point P1 of the own vehicle $V_O$ is set as the target point, and the target trajectory is selected. On the other hand, when the visibility rate is less than 100% (No in step S53), the process proceeds to step S5, and an alternative target point is set such that the visibility rate after a predetermined time becomes 100%. When there is no alternative target point at which the visibility rate becomes 100% at the end of the loop, the target point where the visibility rate is the highest is selected. At this time, the speed of the own vehicle $V_O$ is reduced to a speed at which the blind spot area can be safely passed, or if necessary, collision avoidance control based on steering is executed (not illustrated).

In the first example or the second example, the visibility rate of the original sensor detectable range is compared with the threshold value to determine whether or not to change the trajectory of the own vehicle $V_O$ (offset in the lateral direction), wherein when a target point at which the visibility rate is greater than or equal to the threshold value cannot be calculated, the speed of the own vehicle $V_O$ needs to be reduced in order to ensure safety regardless of whether or not an object jumping out exists, and hence the number of decelerations becomes frequent and the riding comfort may be impaired.

On the other hand, by applying the fifth example, the speed of the own vehicle $V_O$ does not need to be reduced as long as the visibility rate in the safety area is 100% even if the visibility rate in the entire sensor detectable range is not greater than or equal to the threshold value. Even if the object jumps out, collision can be safely avoided if the own vehicle $V_O$ executes the avoidance action since the inter-vehicle distance for performing collision avoidance is secured in advance. As described above, since the own vehicle $V_O$ decelerates only when an object jumping out exists, the frequency of deceleration can be suppressed by applying the fifth example, and the riding comfort can be improved while ensuring safety.

Furthermore, the present example can be combined with the fourth example, and in a case where there is a target point where the visibility rate of the safety area is 100%, the automatic driving under the system responsibility is continued, and in a case where the visibility rate in the safety area does not become 100%, the automatic driving level is changed so as to switch from the automatic driving under the system responsibility to the automatic driving under the driver responsibility, and the driver is alerted through the HMI device 5 and an action such as requesting to grip the steering wheel can be performed. Accordingly, when the target trajectory that can secure a sufficient visibility for safe traveling cannot be calculated, it is possible to notify the driver of the possibility that the risk prediction hidden in the sensing disabled region cannot be performed in advance by switching to the automatic driving under the driver responsibility, and both the safety of the system and the riding comfort can be improved.

REFERENCE SIGNS LIST

1 . . . in-vehicle control system
2 . . . external environment sensor
3 . . . internal environment sensor
4 . . . navigation system
5 . . . HMI device
6 . . . cognition determination device
61 . . . recognizing unit
62 . . . driving action planning unit
63 . . . trajectory planning unit
7 . . . vehicle motion control device
8 . . . steering control device
9 . . . accelerator control device
10 . . . brake control device
P1 . . . reference target point
P2, P3 . . . alternative target point

The invention claimed is:

1. A system for controlling a vehicle, the system comprising:
a memory;
a communication interface that is communicatively coupled to a first sensor that monitors a front of the vehicle, a second sensor that monitors a left-side of the vehicle, and a third sensor that monitors a right-side of the vehicle; and
a Central Processing Unit (CPU) that is communicatively coupled to the memory and the communication interface, wherein the CPU is configured to:
receive recognition information from at least one of the second sensor or the third sensor,
recognize an object at a periphery of the vehicle based on the recognition information,
receive an image from the first sensor,
divide the periphery of the vehicle into a plurality of regions based on the image,
calculate a weight that is applied to each of the plurality of regions based on the object recognized, wherein the weight indicates a relative level of importance of a respective region,
apply the weight to each of the plurality of regions to form a weighted image of the periphery of the vehicle,
plan a trajectory of the vehicle based on the weighted image and
control the vehicle according to the trajectory by transmitting a signal to a vehicle control device.

2. The system according to claim 1, wherein:
the CPU is further configured to generate an overhead view image of the periphery of the vehicle based on the recognition information, and
the weight that is applied to each of the plurality of regions is calculated by:
calculating a detectable range of the first sensor based on the overhead view image,
calculating an actual detection range that is not shielded by the object in the detectable range, and
calculating the weight that is applied to each of the plurality of regions based on the actual detection range.

3. The system according to claim 1, wherein the CPU is further configured to:
set an alternative target point laterally farther from the object than a reference target point that is reached when a steering control is not changed, in a case where a visibility rate, which is a ratio between an actual detection range of the first sensor after a predetermined time and a detectable range, is predicted to be less than a threshold value; and
when the visibility rate at the alternative target point is greater than or equal to the threshold value, plan the trajectory toward the alternative target point.

4. The system according to claim 3, wherein the threshold value is changed according to an environment.

5. The system according to claim 3, wherein the CPU is further configured to:
continue the control of the vehicle when the trajectory based on a value greater than or equal to the threshold value exists, and
discontinue the control of the vehicle when the trajectory based on a value greater than or equal to the threshold value does not exist.

6. The system according to claim 5, further comprising:
a Human Machine Interface (HMI); wherein the CPU if further configured to:
when the trajectory based on the value greater than or equal to the threshold value does not exist, notify, using the HMI, a driver that the control of the vehicle is being discontinued.

7. The system according to claim 1, wherein the CPU is further configured to:
set an alternative target point laterally farther from the object than a reference target point that is reached when a steering control is not changed, in a case where an actual detection range of the first sensor after a predetermined time is predicted to be less than a threshold value; and
when the actual detection range at the alternative target point set is greater than or equal to the threshold value, plan the trajectory toward the alternative target point.

8. The system according to claim 7, wherein the threshold value is changed according to an environment.

9. The system according to claim 7, wherein the CPU is further configured to:
continue the control of the vehicle when the trajectory based on a value greater than or equal to the threshold value exists, and
discontinue the control of the vehicle when the trajectory based on the value greater than or equal to the threshold value does not exist.

10. The system according to claim 9, further comprising:
a Human Machine Interface (HMI); wherein the CPU if further configured to:
when the trajectory based on a value greater than or equal to the threshold value does not exist, notify, using the HMI, a driver that the control of the vehicle is being discontinued.

11. The system according to claim 1, wherein the CPU is further configured to:
predict an object jumping out from a blind spot area based on recognition information, and
calculate a safety area based on a prediction result and a speed of the vehicle; wherein the trajectory is planned such that a visibility rate of the safety area is 100%.

12. The system according to claim 11, wherein the CPU is further configured to:
continue the control of the vehicle when the visibility rate of 100% exists, and
discontinue the control of the vehicle when the visibility rate of 100% does not exist.

13. The system according to claim 12, further comprising:
a Human Machine Interface (HMI); wherein the CPU if further configured to:
when the visibility rate of 100% does not exist, notify, using the HMI, a driver that the control of the vehicle is being discontinued.

14. The system according to claim 1, wherein the first sensor comprises at least one of a stereo camera or a millimeter wave radar.

15. The system according to claim 1, wherein the second sensor and the third sensor each comprise at least one of a millimeter wave radar, an ultrasonic sensor, a monocular camera, or a light detection and ranging (LiDAR).

16. A method for controlling a vehicle, the method comprising:
receiving an image from a first sensor, wherein the first sensor monitors a front of the vehicle;
receiving recognition information from at least one of a second sensor or a third sensor, wherein the second sensor monitors a left-side of the vehicle and the third sensor monitors a right-side of the vehicle;
recognizing an object at a periphery of the vehicle based on the recognition information;
dividing the periphery into a plurality of regions based on the image;
calculating a weight that is applied to each of the plurality of regions based on the object recognized, wherein the weight indicates a relative level of importance of a respective region;
applying the weight to each of the plurality of regions to form a weighted image of the periphery of the vehicle;
planning a trajectory of the vehicle based on the weighted image; and
controlling the vehicle according to the trajectory by transmitting a signal to a vehicle control device.

17. The method according to claim 16, wherein the first sensor comprises at least one of a stereo camera or a millimeter wave radar.

18. The method according to claim 16, wherein the second sensor and the third sensor each comprise at least one of a millimeter wave radar, an ultrasonic sensor, a monocular camera, or a light detection and ranging (LiDAR).

* * * * *